(12) United States Patent
Park

(10) Patent No.: US 7,116,969 B2
(45) Date of Patent: Oct. 3, 2006

(54) WIRELESS DEVICE HAVING A SECURE CLOCK AUTHENTICATION METHOD AND APPARATUS

(75) Inventor: Kenneth James Park, Cathlamet, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 317 days.

(21) Appl. No.: 10/778,566

(22) Filed: Feb. 12, 2004

(65) Prior Publication Data

US 2005/0181761 A1  Aug. 18, 2005

(51) Int. Cl.
 H04M 1/66 (2006.01)
(52) U.S. Cl. ............... 455/410; 455/414.1; 455/414.2; 455/414.3; 455/425; 455/411; 705/405; 705/44; 705/64
(58) Field of Classification Search ........... 455/410, 455/411, 425; 705/64, 44
See application file for complete search history.

(56) References Cited

U.S. PATENT DOCUMENTS

| 5,483,276 A | * | 1/1996 | Brooks et al. ................ 725/10 |
| 5,825,876 A | * | 10/1998 | Peterson, Jr. ................ 705/52 |
| 5,946,672 A | | 8/1999 | Chrosny et al. |
| 5,999,921 A | | 12/1999 | Arsenault et al. |
| 6,023,690 A | | 2/2000 | Chrosny et al. |
| 6,990,359 B1 | * | 1/2006 | Wager .......................... 455/561 |
| 2002/0077985 A1 | | 6/2002 | Kobata et al. |
| 2003/0061165 A1 | * | 3/2003 | Okamoto et al. ............. 705/52 |
| 2003/0069854 A1 | * | 4/2003 | Hsu et al. ....................... 705/59 |
| 2003/0115469 A1 | | 6/2003 | Shippy et al. |
| 2003/0167392 A1 | * | 9/2003 | Fransdonk ................... 713/156 |
| 2003/0233553 A1 | * | 12/2003 | Parks et al. ................. 713/178 |

FOREIGN PATENT DOCUMENTS

WO   WO 2003/005145 A2   1/2003

* cited by examiner

*Primary Examiner*—Nick Corsaro
*Assistant Examiner*—Diego Herrera
(74) *Attorney, Agent, or Firm*—Robert D. Varitz, PC

(57) ABSTRACT

A method of providing a secure clock in a communication device in contact with a communication system includes detecting a clock event whenever a clock event occurs; initializing a secure clock and setting a secure clock flag to TRUE; and setting the secure clock to a secure clock time. A secure clock mechanism for use in a communication device which is in contact with a communication system includes real-time clock hardware; programmable memory and non-volatile memory; and a back-up battery for powering the secure clock mechanism; a clock event detection mechanism for detecting clock events, which are taken from a group of clock events consisting of user clock events and system clock events; a secure clock initializing mechanism for setting the secure clock and for setting a secure clock flag to TRUE; and a secure clock setting mechainism for setting the secure clock to a secure clock time.

12 Claims, 3 Drawing Sheets

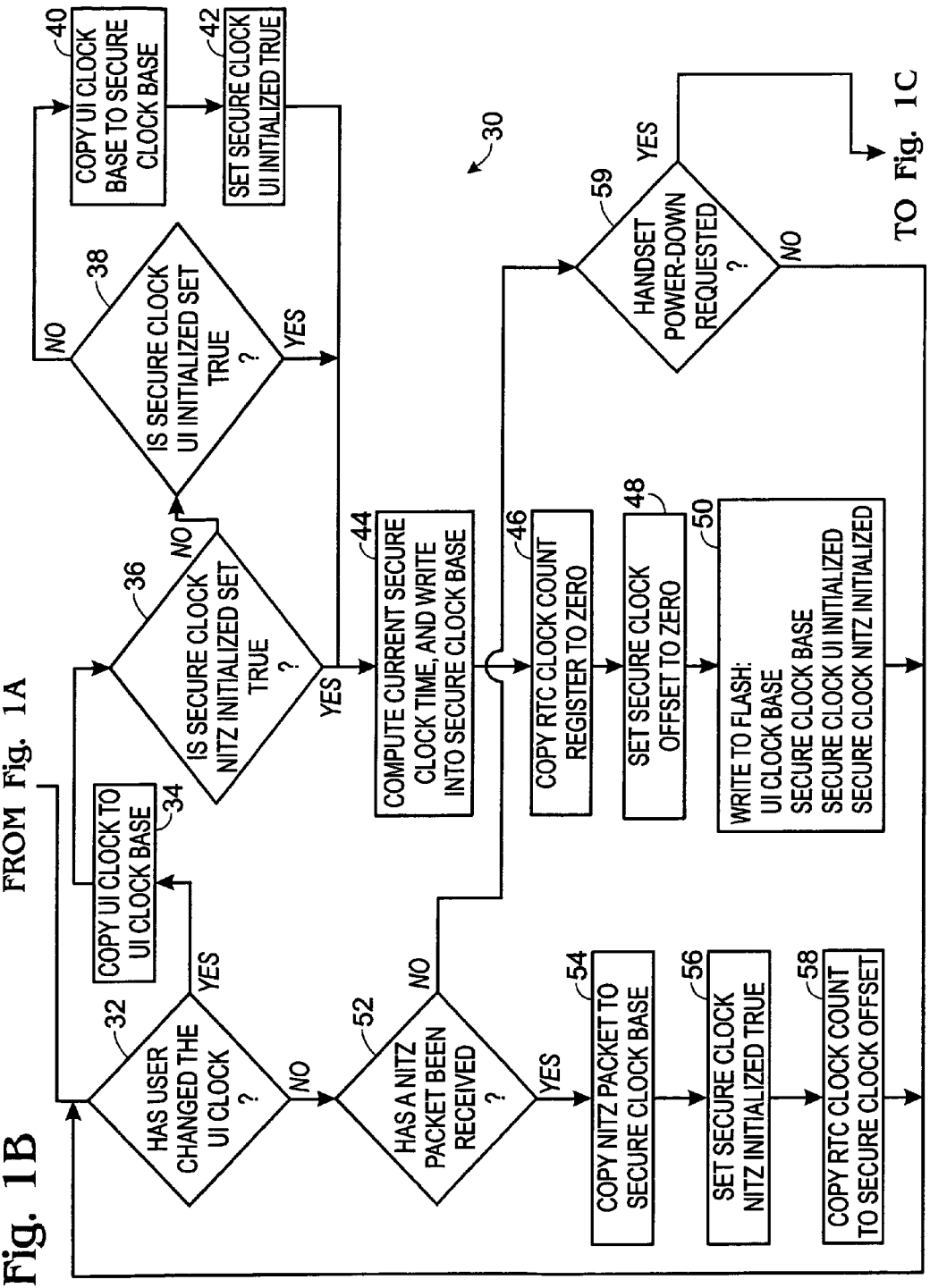

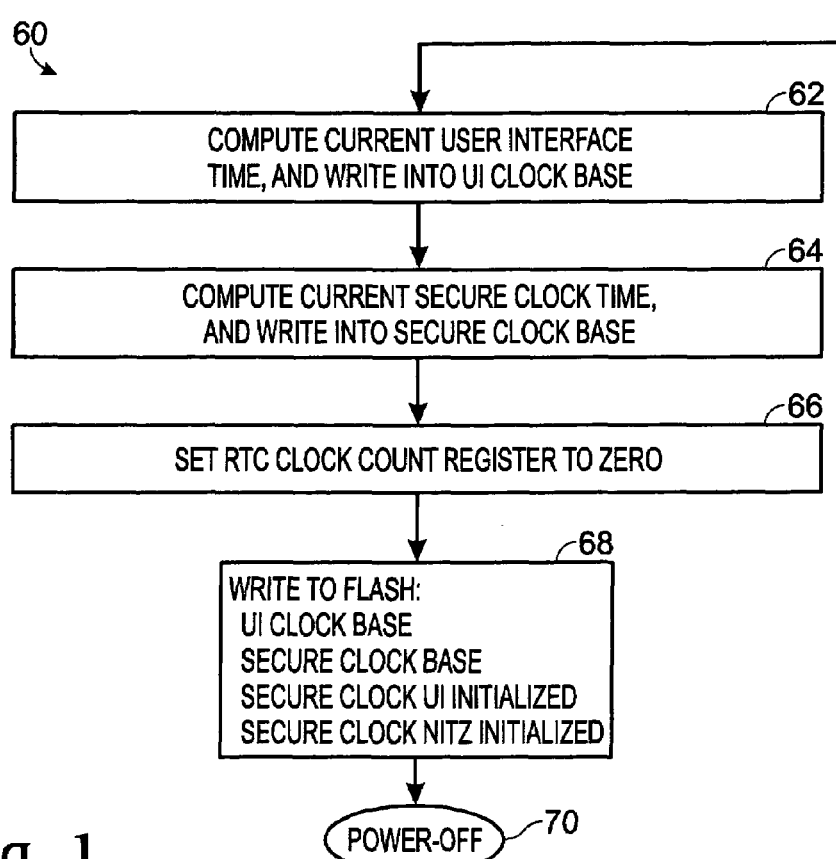
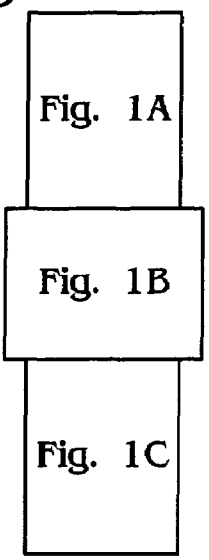

WIRELESS DEVICE HAVING A SECURE CLOCK AUTHENTICATION METHOD AND APPARATUS

FIELD OF THE INVENTION

This invention relates to a secure clock for digital rights management, and specifically, to a time-keeping mechanism and method which cannot be altered by a user.

BACKGROUND OF THE INVENTION

Some semi-autonomous processes on mobile phones require a time source which cannot be arbitrarily manipulated by the user. Such time sources provide what is referred to herein as "secure time". In the case of digital rights management (DRM) on a handset operating under global system for mobile communications (GSM) protocols, secure time is needed to determine if time constraints placed upon DRM controlled content remains in force, e.g., how much usage time has been used. This is applied to situations where a user or subscriber is allowed a specific amount of time, or a time window, in which to use an item, such as a video presentation. A DRM protocol may be applied, e.g., to the rights to view a motion picture which is downloaded from a server. Typically, the motion picture is encapsulated within a DRM protocol, which incorporates a security protocol, e.g., a public key infrastructure (PKI), which allows use of the downloaded information for a set period of time. In order to insure that the downloaded information is only used during its valid time period, a mechanism must be provided to prevent a user from arbitrarily changing the system clock of the device containing the downloaded information, which, if allowed, would enable unlimited usage of the downloaded information.

One time source for the DRM is the clock provided in a mobile communication device user interface, however, the user interface clock can be arbitrarily set by the user, making it unreliable for DRM purposes.

Although GSM protocols define a means of transmitting a secure time source packet from the GSM network, which is referred to as a network identity and time zone (NITZ) signal, service providers are not required to transmit this time signal. Presently, only a few service providers are providing NITZ, e.g., Cingular, ATT, while others, e.g., Vodafone, are still investigating how to employ it. Furthermore, service providers which do supply NITZ do not guaranteeing system wide coverage, making their NITZ implementation sporadic.

Another source of secure time is to construct an Internet server which provides correct time to any client upon request. However, this protocol has several drawbacks: First, any Internet connection made by the handset incurs air time charges, which are billed to the user; second, users may find it unacceptable that their handset autonomously and periodically connects to a remote server, i.e., the Big Brother Syndrome; and third, such a server requires adequate bandwidth/computing resources to serve potentially millions of hits-per-month, and needs to provide a protocol to insure that a server outage does not cause any handset to cease operation.

The power density of current backup batteries, consumer demand for ever smaller handsets, and the corresponding high power consumption of integrated real time clock (RTC) hardware, limit the capabilities of a battery backed-up secure time source to one to two weeks. Such a short battery life precludes provision of a factory-set, secure-time source which operates independently of the main battery over the device's lifetime. Some GSM handsets, such as the Sharp GX30 handset, include a separate, internal, user-inaccessible, rechargeable battery, which provides power for the RTC hardware for up to two weeks, in the event that the handset's main battery is discharged or disconnected.

U.S. Pat. No. 6,023,690 to Chrosny et al., granted Feb. 8, 2000, for Method and apparatus for securely resetting a real time clock in a postage meter describes the setting of a single secure clock and the subsequent usage of that clock to enable/disable the printing of postage.

U.S. Pat. No. 5,999,921 to Arsenault et al., granted Dec. 7, 1999, for Electronic postage meter system having plural clock system providing enhanced security describes the maintenance of a non-secure time clock in one format and a secure time clock in a second time format.

U.S. Pat. No. 5,946,672, to Chrosny et al, granted Aug. 31, 1999, for Electronic postage meter system having enhanced clock security describes insertion of an external smart card containing information that identifies the inserted external smart card as a real time clock security card, and only upon receipt of the information is the inserted external smart card determined to be a real time clock security card.

U.S. Patent Publication No. 2003/0115469 A1, of Shippy et al., published Jun. 19, 2003, for Systems and methods for detecting and deterring rollback attacks describes a log which tracks access to protected content, which requires forced periodic updates.

U.S. Patent Publication No. 2002/0077985 A1, of Kobata et al., published Jun. 20, 2002, for Controlling and managing digital assets Distinguishing describes a method for managing digital rights of software on a computer system.

WO2003/005145 A2, for Digital rights management in a mobile communications environment, of Kontio et al., published Jan. 16, 2003, describes a method for control the access, copying, and/or transfer of a digital asset by mobile, wireless devices.

SUMMARY OF THE INVENTION

A method of providing a secure clock in a communication device in contact with a communication system includes providing, in the communication device, real-time clock hardware, including a real time clock count register, programmable memory and non-volatile memory, and a back-up battery; detecting a clock event whenever a clock event occurs; wherein a clock event is taken from a group of clock events consisting of user clock events and system clock events; initializing a secure clock base, setting a secure clock flag to TRUE, and determining a secure clock offset; and setting the secure clock to a secure clock time.

A secure clock mechanism for use in a communication device which is in contact with a communication system includes real-time clock hardware, including a battery fail register which provides a Boolean true/false value for indicating whether the supply current to the real time clock has failed, and a clock count register; programmable memory and non-volatile memory, including a user interface clock base for holding a time and date value which is set by the user, a secure clock base for holding a time and date value set by either the communication system or the user, a secure clock offset, and a secure clock initializer for indicating whether the time and date value in the secure clock variable has been initialized to a time and date other then a default time and date; a back-up battery for powering the secure clock mechanism; a clock event detection mechanism for detecting clock events, which are taken from a group of clock events consisting of user clock events and system clock events; a secure clock initializing mechanism for setting the secure clock and for setting a secure clock flag to TRUE; and a secure clock setting mechanism for setting the secure clock to a secure clock time.

It is an object of the invention to provide a secure clock which cannot be arbitrarily altered by a user.

It is another object of the invention to provide a secure clock which may be set to the proper time and date by a variety of methods, none of which allow user adjustment.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

Figure 1A:
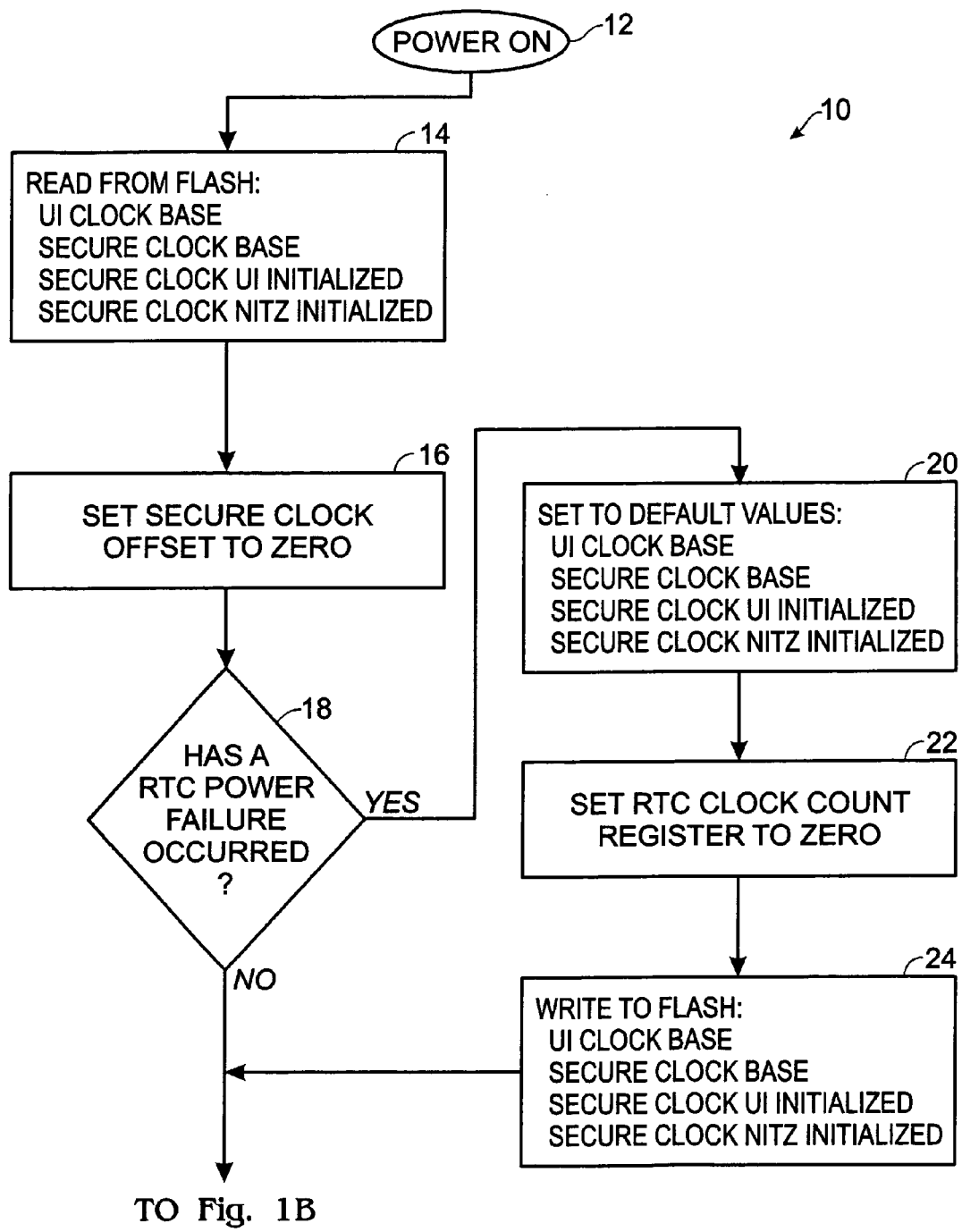
FIG. 1 is a block diagram of the method of the invention and the interaction between the method of the invention and the apparatus of the invention, which consists of FIGS. 1A, 1B and 1C.

The invention provides a secure time source in a device, such as a global system for mobile communications (GSM) communication device, e.g., a cellular phone, which is normally provided with only a user interface clock. A feature of this invention is that it uses the initial setting of the user interface clock, the state of a real-time clock (RTC) Battery Failure detection circuitry and other external time sources, i.e., network identity and time zone (NITZ) or Time Server, to provide digital rights management (DRM) or other processes with a secure time source that cannot be altered by the user. The following communication device components are used in the invention:

Real Time Clock Hardware: The real time clock hardware is a battery backed-up counter with control and status registers. The hardware allows the handset to read the current value of the counter, reset the counter to zero upon the occurrence of a specific event, and detect whether the backup power source has failed.

1. Battery Fail Register: This register is part of the RTC hardware, and provides a Boolean true/false value which indicates that the supply current to the RTC has failed, and that the value in the clock count register is not valid.

2. Clock Count Register: This register is part of the RTC hardware. It provides a count value from zero to N, where N is $2^{40}$, which, once started, automatically increments at a pre-determined rate. Assuming a 32 kHz operating speed, the clock count register will count for about seven years if not reset to zero. The handset's program reads the value of this register, and sets the value of this register to zero.

Programmable Memory: Programmable memory stores the run-time values for the following variables:

1. User Interface Clock Base: This RAM and flash memory variable holds a time and date value which is set by the user, and is associated with the RTC clock count register when the RTC clock count register is set to zero. The value of this variable is not incremented. To calculate the current time, the value in the user interface clock base is added to the value in RTC clock count register.
2. Secure Clock Base: This RAM and flash memory variable holds the time and date value set by either NITZ or the user. It is associated with the RTC clock count register when the RTC clock count register is set to zero, and associated with an offset counter, which may or may not be set to zero. The value of this variable is not incremented. To calculate the secure clock current time, the value in the secure clock base is added to the difference between the values in the RTC clock count register and secure clock offset.
3. Secure Clock Offset. This RAM variable is used as an offset and is set, from zero to N, to the current value of the RTC clock count register upon the arrival and processing of time date information in a NITZ packet.
4. Secure Clock Initialized: This RAM and flash memory Boolean true/false variable indicates that the time and date value in the secure clock variable has been initialized to a time and date other then the default time and date.

Non-Volatile Memory: Non-volatile memory maintains the values of the following variables, which are the same as identified in the previous section, regardless of the state of the main battery. The values are read into and out of the non-volatile memory as needed by the system and method of the invention.

1. User Interface Clock Base.
2. Secure Clock Base.
3. Secure Clock Initialization.
4. Secure Clock NITZ Initialization.

Back-up Battery: The back-up battery is a small, non-user serviceable battery which maintains the operational state of the RTC, while the main battery is removed, or is discharges to a level below the minimum operational voltage of the RTC.

Computing User Interface Time
(User_interface_time_date)=(User_Interface_Clock_Base)+(RTC_Clock_Count_Register)

Computing Secure Time
(secure_time_date)=(Secure_Clock_Base)+(RTC_Clock_Count_Register−Secure_Clock_Offset)

Referring now to FIG. 1A, a power-on sequence of the invention is depicted generally at 10. When a handset is powered-on, 12, it reads, from flash memory, 14, the current values for the user interface clock base, the secure clock base, the secure clock initialized flag, and the secure clock NITZ initialized flag. The secure clock offset is set to zero, 16. The handset checks the state of the battery fail register of the RTC to determine if its current "notion" of time is valid, 18, by determining if a RTC power failure has occurred. If the handset detects a battery failure condition, it re-initialize the values of the user interface clock base and secure clock base to a default time and date, and sets a secure clock initialized flag and NITZ initialized flag to FALSE, 20. The RTC clock count register is set to zero, 22. It then stores (writes) the new (default) values to flash memory, 24. Regardless of the state of the battery fail register, the value of secure clock offset is always set to zero on power-up.

Referring to FIG. 1B, an operational sequence of the invention is depicted generally at 30. Sometime after the power-up process has been completed, the user will detect that the clock is set to a default time and date, which prompts the user to set the handset to the current date and time, which also provided an indication that the user has changed the UI clock, 32, a user clock event. If it is the case that the user has changed the UI clock (YES to 32), the value for user interface clock is copied to the UI clock base 34, which is set to the time date entered by the user. If the secure clock NITZ initialization is not set (NO to 36), the secure clock UI is checked to determined it's flag setting, 38. If the secure clock initialization flag is FALSE (NO to 38), the new user interface clock base value is used to set the secure clock base value 40, and the secure clock (YES to 38) initialized variable is set to TRUE 42. If the secure clock NITZ is set to TRUE (YES to 36) or if the secure clock interface variable is set to TRUE (YES to 38), the current secure clock time is computed and written to the secure clock base, 44. The RTC clock count register is set to zero, 46, and the state of secure clock offset set to zero, 48. The new values for the user interface clock base, secure clock base, secure clock UI initialized and secure clock NITZ initialized are then entered in flash memory, 50. If the user subsequently changes the value of the user interface clock base via the UI clock set function, the state of the secure clock initialized will prevent the new setting from affecting the value of secure clock base.

If the handset detects that the user has not changed the UI clock (NO to 32), but if a NITZ packet has been received (YES to 52), a system clock event, the value of secure clock base is set to the NITZ value, 54, the value of secure clock NITZ initialized is set to TRUE, 56, and the value of RTC clock count register is written to secure clock offset, 58. To correctly associate the new value of secure clock base, e.g., from NITZ, with the value of RTC clock count register, which was not reset to zero at NITZ reception, a variable called "secure clock offset" is defined. Its function is to hold the value of RTC Clock Count Register at the time of each NITZ reception. When current time from the secure clock base is calculated, the offset is applied to the current value of RTC clock count register before it is added to secure clock base. Blocks 32 and 52 comprise what is referred to herein as a clock event detection mechanism. Blocks 44, 48, 56 and 58 comprise what is referred to herein as a secure clock initializing mechanism. Blocks 44–48 and 58 comprise what is referred to herein as a secure clock setting mechanism. As previously noted, (secure_time_date)=(Secure_Clock_Base)+(RTC_Clock_Count_Register−Secure_Clock_Offset).

When an external time source, e.g., NITZ, Time Server, etc., is used to update the secure clock base, an update of flash memory to reflect the new values is postponed until power-down, or to when the user changes the value of user interface clock base. If flash memory is updated with a new secure clock base value upon reception of every NITZ packet, the maximum number of flash memory write cycles will likely be exceeded over the lifetime of the handset. Also, the non-volatile write process will stop all other processes and incur a latency which is not acceptable to the user. If a power-down request is received by the hand set (YES to 59), the handset begins its power-down sequence, depicted in FIG. 1C. Otherwise, the operational sequence of FIG. 1B periodically repeats until a power-down request is received, or until the primary battery begins to fail, which will initiate an automatic power-down.

Referring now to FIG. 1C, a power-down sequence of the invention is depicted generally at 60. When the handset powers-down, e.g., receives a power-down request, the values for user interface clock base and secure clock base in flash memory must be updated to reflect the current time. The current user interface time is calculated using the value of user interface clock base and RTC clock count register. That new value is written into flash memory as user interface clock base, 62. Current secure time is calculated using the value of secure clock base and the difference between RTC clock count register and secure clock offset, 64. The RTC clock count register is set to zero, 66. The new value of secure time is written into flash memory as secure clock base, 68. The hand set is powered-down, 70.

Alternately, the new NITZ time may be compared with the old secure clock time, and, if the absolute value of the new NITZ time less the secure clock time is greater than a predetermined number of seconds, the secure clock time may be updated with the new NITZ time. The run time data may or may not be updated with the new NITZ time when the flash memory is not updated. If this alternative technique is used, the update to flash memory for both the UI clock base and the secure clock base may not need to occur at power-down.

Thus, a method and apparatus for a semi-secure clock for use in a mobile phone has been disclosed. It will be appreciated that further variations and modifications thereof may be made within the scope of the invention as defined in the appended claims.

I claim:

1. A method of providing a secure clock in a communication device in contact with a communication system, comprising:

providing, in the communication device, real-time clock hardware, including a real time clock count register, programmable memory and non-volatile memory, and a back-up battery, wherein said providing includes providing a battery fail register which further provides a Boolean true/false value for indicating whether the supply current to the real time clock has failed; a clock count register; a user interface clock base for holding a time and date value which is set by the user; a secure clock base for holding a time and date value set by either the communication system or the user; a secure clock offset; and a secure clock initializer for indicating whether the time and date value in the secure clock variable has been initialized to a time and date other than a default time and date;

detecting a clock event whenever a clock event occurs; wherein a clock event is taken from a group of clock events consisting of user clock events and system clock events;

initializing a secure clock base, setting a secure clock flag to TRUE, and determining a secure clock offset; and setting the secure clock to a secure clock time including computing a current user interface time and storing the computed user interface time in the user interface clock base; computing a current secure clock time and storing the computed secure clock time in the secure clock base; and storing the current time in the programmable memory, wherein said computing further includes setting the real-time clock count register to zero and setting the secure clock offset to zero, respectively.

2. The method of claim 1 wherein said setting the secure clock includes setting the secure clock as a function of the secure clock base and the RTC clock count register less the secure clock offset.

3. The method of claim 1 wherein said system clock event includes receipt of a NITZ packet from the communication system which NITZ packet is used to set the secure clock base.

4. The method of claim 1 which further includes a power-on sequence comprising:

reading, from non-volatile memory, the current values for the user interface clock base, the secure clock base, the secure clock initialized flag, and the secure clock NITZ initialized flag;

setting the secure clock offset to zero;

checking the state of the battery fail register of the RTC to determine if its current notion of time is valid by determining if a RTC power failure has occurred;

re-initializing the values of the user interface clock base and secure clock base to a default time and date if a battery failure condition is detected;

setting a secure clock initialized flag and the secure clock NITZ initialized flag to FALSE;

setting the real-time clock count register to zero; and storing the new values to non-volatile memory.

5. The method of claim 1 which further includes a power down sequence comprising:

calculating the current user interface time using the value of the user interface clock base and the real-time clock count register;

writing the calculated current user interface time to non-volatile memory as the user interface clock base;

calculating a current secure time value using the value of the secure clock base and the difference between the real-time clock count register and the secure clock offset;

setting the real-time clock count register to zero;

writing the calculated value of secure time to non-volatile memory as secure clock base; and powering down the hand set.

6. A method of providing a secure clock in a communication device in contact with a communication system, comprising:

providing, in the communication device, real-time clock hardware, including a real time clock count register, programmable memory and non-volatile memory, and a back-up battery, and which further includes providing a battery fail register which provides a Boolean true/false value for indicating whether the supply current to the real time clock has failed; a user interface clock base for holding a time and date value which is set by the user; a secure clock base for holding a time and date value set by either the communication system or the user; a secure clock offset; and a secure clock initializer for indicating whether the time and date value in the secure clock variable has been initialized to a time and date other than a default time and date;

detecting a clock event whenever a clock event occurs; wherein a clock event is taken from a group of clock events consisting of user clock events and system clock events;

initializing a secure clock base, setting a secure clock flag to TRUE, and determining a secure clock offset; and setting the secure clock to a secure clock time as a function of the secure clock base and the RTC clock count register less the secure clock offset, wherein said computing further includes setting the real-time clock count register to zero and setting the secure clock offset to zero, respectively.

7. The method of claim 6 wherein said setting the secure clock includes computing a current user interface time and storing the computed user interface time in the user interface clock base; computing a current secure clock time and storing the computed secure clock time in the secure clock base; and storing the current time in the programmable memory.

8. The method of claim 6 wherein said system clock event includes receipt of a NITZ packet from the communication system which NITZ packet is used to set the secure clock base.

9. The method of claim 6 which further includes a power-on sequence comprising:

reading, from non-volatile memory, the current values for the user interface clock base, the secure clock base, the secure clock initialized flag, and the secure clock NITZ initialized flag;

setting the secure clock offset to zero;

checking the state of the battery fail register of the RTC to determine if its current notion of time is valid by determining if a RTC power failure has occurred;

re-initializing the values of the user interface clock base and secure clock base to a default time and date if a battery failure condition is detected;

setting a secure clock initialized flag and the secure clock NITZ initialized flag to FALSE;

setting the real-time clock count register to zero; and storing the new values to non-volatile memory.

10. The method of claim 6 which further includes a power down sequence comprising:

calculating the current user interface time using the value of the user interface clock base and the real-time clock count register;

writing the calculated current user interface time to non-volatile memory as the user interface clock base;

calculating a current secure time value using the value of the secure clock base and the difference between the real-time clock count register and the secure clock offset;

setting the real-time clock count register to zero;

writing the calculated value of secure time to non-volatile memory as secure clock base; and powering down the hand set.

11. A secure clock mechanism for use in a communication device which is in contact with a communication system, comprising:

real-time clock hardware, including a battery fail register which provides a Boolean true/false value for indicating whether the supply current to the real time clock has failed, and a clock count register;

programmable memory and non-volatile memory, including a user interface clock base for holding a time and date value which is set by the user, a secure clock base for holding a time and date value set by either the communication system or the user, a secure clock offset, and a secure clock initializer for indicating whether the time and date value in the secure clock variable has been initialized to a time and date other than a default time and date;

a back-up battery for powering the secure clock mechanism;

a clock event detection mechanism for detecting clock events, which are taken from a group of clock events consisting of user clock events and system clock events;

a secure clock initializing mechanism for setting the secure clock and for setting a secure clock flag to TRUE; and a secure clock setting mechanism for setting the secure clock to a secure clock time, which includes setting a real-time clock count register to zero and setting a secure clock offset to zero.

12. The secure clock mechanism of claim 11 wherein said clock event detection mechanism detects system clock events, including receipt of NITZ packets from the communication system.

* * * * *